United States Patent [19]
Borchardt

[11] 3,835,573
[45] Sept. 17, 1974

[54] LINE RELEASE TROLLING PLANER
[76] Inventor: Hans J. Borchardt, 4664 Norwood, Wilmington, Del. 19803
[22] Filed: Jan. 31, 1973
[21] Appl. No.: 327,407

[52] U.S. Cl................................ 43/43.12, 43/43.13
[51] Int. Cl............................................. A01k 95/00
[58] Field of Search........................ 43/43.12, 43.13

[56] References Cited
UNITED STATES PATENTS
| | | | |
|---|---|---|---|
| 2,545,185 | 3/1951 | Winslow | 43/43.13 |
| 2,749,649 | 6/1956 | Fitzsimmons | 43/43.12 |
| 3,140,555 | 7/1964 | Gross | 43/43.13 |
| 3,199,242 | 8/1965 | Holmstrom | 43/43.12 X |
| 3,667,148 | 6/1972 | Dawson | 43/43.13 |

Primary Examiner—Hugh R. Chamblee
Assistant Examiner—Daniel J. Leach
Attorney, Agent, or Firm—Herbert W. Larson

[57] ABSTRACT

A trolling planer comprising a rectangular plate with a freely movable line release mechanism attached to the rear end thereof. A wire frame with a weight thereon is secured to the plate and a ring, which is attached to a line secured to a vessel, is slidably mounted on the frame. The release mechanism holds a trolled fishing line in a deep submerged position until the strike of a fish detaches the fishing line from the release mechanism, the trolling planer being thereafter separately retrieved without interfering with the capture of the fish.

2 Claims, 4 Drawing Figures

PATENTED SEP 17 1974　　3,835,573

LINE RELEASE TROLLING PLANER

BACKGROUND OF THE INVENTION

This invention relates to fishing devices. More particularly it refers to a trolling planer with a release mechanism serving to carry a trolled fishing line deep into the water but quickly releasing the fishing line after the strike of a fish giving the angler a line to the fish unencumbered by mechanical devices.

In trolling for fish it is necessary at times to maintain the fishing line and particularly the bait or lure at a considerable depth. The prior art is replete with devices attempting to achieve this depth. The prior art devices have required the use of heavily weighted lines, devices for releasing sinkers or the use of planers with triggers, trips, ratchets and the like to provide for a change in attitude of a planer. In each case the fish is brought in on a line encumbered with a heavy weight or a mechanical device. A heavy rod and line must be used to support such encumbrances. This detracts from the sport found in fighting a fish with light tackle free of weight. Further it is often necessary to have a long line between the encumbrance and the bait or lure to prevent the fish from being frightened by such encumbrance. Line can only be retrieved with rod and reel up to the line encumbrance and the rest must be retrieved by handlining. Therefore, the final stages of catching a fish, frequently the most exciting one, involves the less sporting handline procedure.

Examples of deep submergence trolling devices found in the prior art are:
Coolidge U.S. Pat. No. 2,235,868
Mathieu U.S. Pat. No. 2,562,054
Walden U.S. Pat. No. 3,447,255
Olds U.S. Pat. No. 3,543,431 and
Scarbro U.S. Pat. No. 3,583,089.

Another type of submergence device known in the art and commonly called a "downrigger" comprises a heavy weight with a line release mechanism. The weight is raised and lowered from a boat by a line generally connected to a mechanical retrieve device. The trolled fishing line is carried by the release mechanism but is quickly detached after the strike of a fish giving the angler a line to the fish unencumbered by mechanical devices. Manipulating the heavy weight carrying the release is difficult. Consequently such mechanical retrieve devices commonly used are costly and bulky.

SUMMARY OF THE INVENTION

This invention provides a deep submergence trolling device which does not use heavy weights and which does not encumber the fishing line with mechanical devices. Specifically, it provides a trolling planer which takes fishing line deep into the water but has a release mechanism that detaches the fishing line after a strike. The planer can have an attitude changing mechanism, but can be used without such a mechanism. As a result the fish can be pulled in by the angler unencumbered by mechanical devices. The trolling device can be separately retrieved easily and without a mechanical aid while the angler is fighting his fish.

In order to attain these ends, the trolling planer of my invention comprises a device which is a rectangular plate curved downward on its port and starboard sides. The plate is supported by a wire frame having a weight forward and below the plate. A suitable line is attached from the trolling boat to the frame by a ring slidable along the wire frame. The stern portion of the plate has affixed to it in any suitable manner a release means such as a clothes pin or spring mechanism of sufficient tension to retain the fishing line under normal trolling speeds, but insufficient to hold the fishing line from the force exerted by a fish striking the trolled bait or lure. The release means is affixed to the plate by an attaching means such as a ring, swivel or line.

DESCRIPTION OF THE PREFERRED EMBODIMENTS

Figure 1:
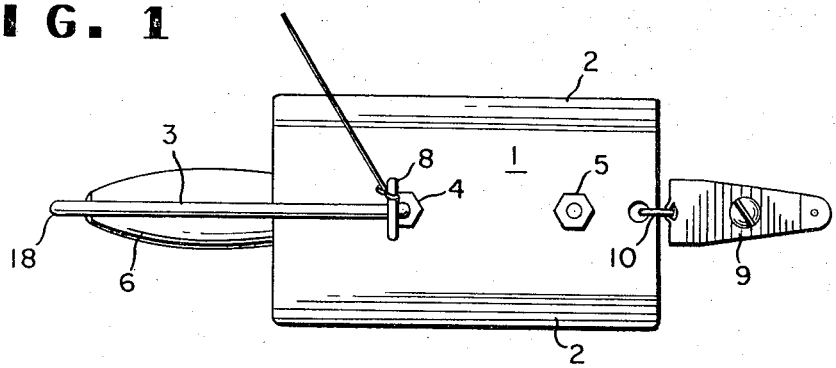
FIGS. 1 and 2 are plan and side views, respectively, of one of the embodiments of the invention.
Figure 2:
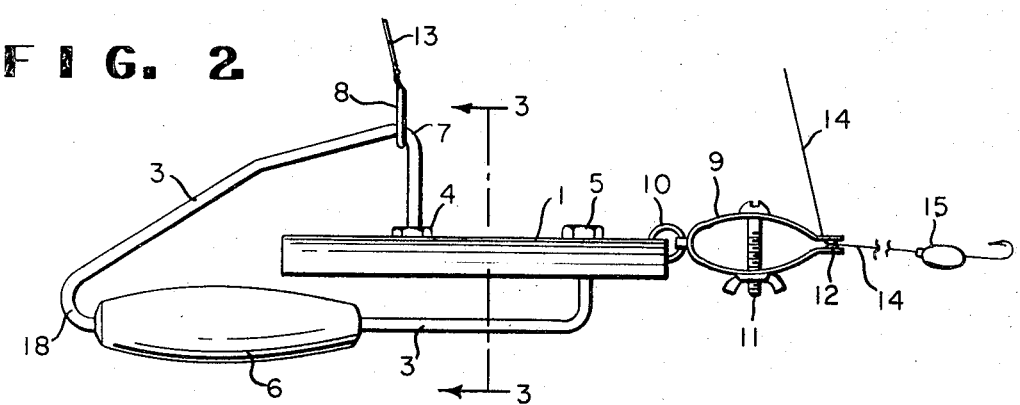
Figure 3:
FIG. 3 is a view of FIG. 2 along the cut 3—3.

FIGS. 1 to 3 show one embodiment of the invention. The plate is rectangular in shape and made of thin non-corrodible steel. The port and starboard edges 2 are turned down to form fin like members. The means for suspending the plate 1 is a wire frame 3 fastened to the plate at 4 and 5 by any suitable means. I prefer to have the ends of the wire threaded and held in place by nuts. Solder is flowed over the wire, nut and plate at their point of contact to prevent slippage. Upon the wire frame and positioned below and forward of the plate is weight 6 which is of a size such that the planer when suspended in air from position 7 hangs with the plate making an angle of about 30° to 60° with the horizon, the forward end of the plate pointing down. Typically this weight will weigh from 1 ounce to about 1 pound. More commonly, the weight will weigh from 6 to 12 ounces.

A ring 8 is slidably mounted on the wire frame 3 and is free to slide from the plate 1 at point 4 to the forward end of the weight 6. A line 13 secures the planer to the trolling vessel by its attachment to the ring 8.

A release 9 is fastened to the plate 1 by an attaching means such as ring 10. The release comprises a spring metal body and an adjustment screw 11 whereby the tension at point 12 can be adjusted. The fishing line 14 passes through and is retained by the tension at point 12. A strike by a fish at 15 will pull the line 14 through the tension point 12.

Figure 4:
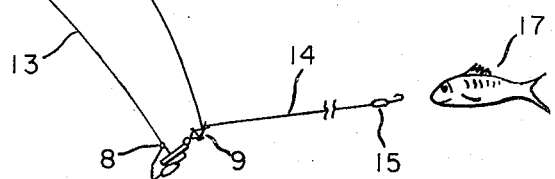
FIG. 4 is a side view of one of the embodiments of the invention in its operative condition.

One way in which the line release trolling planer may be used is illustrated in FIG. 4. With boat underway and rod and reel in hand, the lure is dropped overboard and that length of line 14 is fed out that the lure is to trail the planer by. Now line 14 is placed through release 9. With ring 8 at position 7, the planer is lowered overboard by means of handline 13. Upon striking the water, the planer will dive as a result of water pressure on the planer blade and handline 13 and fishing line 14 are simultaneously fed out until the desired depth is reached.

When a fish strikes the lure, two things may happen, depending upon whether the tension of the release is set tight or loose.

If it is set loose, line 14 snaps out of the release 9 and the angler has a free line to the fish, unencumbered by trolling weights or mechanical devices. After landing the fish and with the boat at rest in the water, the planer can easily be retrieved with handline 13 since the planer is itself not heavy and the water pressure on the blade is minimal because the boat is not moving through the water.

Alternatively, if the release tension were set tight, the planer will "trip". The pull of the hooked fish 17 causes the planer blade to tilt and with this, the ring 8 slides forward from position 7 to position 18. Additional force from the hooked fish pulls the line 14 out of the release and again, the angler has a free line to the fish as above. In this case, however, the planer will automatically rise to the surface, provided that the boat maintains headway. From there, it can be easily retrieved with the handline 13 even while the boat is underway.

Fishing with the release tension loose may be preferable when fishing alone in that the planer stays deep and out of the way of fishing line 14. If assistance is available to haul in the planer after a strike, the alternative procedure is preferable.

The release mechanism may optionally be made integral with the plate in which case there is no need for ring 10. Other common release mechanisms could also be substituted and one would obtain like results. Further, other types of planers can be equipped with a release mechanism to achieve the desirable results of this invention.

I claim:

1. In a trolling planer used to submerge a fishing line and comprising a rectangular metal plate with the port and starboard edges turned down, a wire frame supporting said plate, a weight positioned on said wire frame forward and below said metal plate, a ring slidably mounted on the wire frame and attached to a line which in turn is attached to the trolling vessel, the improvement comprising attaching at the rear of the rectangular metal plate a freely movable release means engaging and holding said fishing line until the strike of a fish releases said fishing line from said release means.

2. The improvement of claim 1 wherein said release means consists of a spring metal body with a single contact point together with an adjustment screw compressing the spring metal body and being capable of increasing or decreasing the tension exerted at the contact point.

* * * * *